(12) United States Patent
Sugiura

(10) Patent No.: US 9,207,808 B2
(45) Date of Patent: Dec. 8, 2015

(54) IMAGE PROCESSING APPARATUS, IMAGE PROCESSING METHOD AND STORAGE MEDIUM

(71) Applicant: KABUSHIKI KAISHA TOSHIBA, Tokyo (JP)

(72) Inventor: Chikashi Sugiura, Hamura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 138 days.

(21) Appl. No.: 13/768,970

(22) Filed: Feb. 15, 2013

(65) Prior Publication Data
US 2014/0145974 A1    May 29, 2014

(30) Foreign Application Priority Data
Nov. 29, 2012   (JP) ................................ 2012-261266

(51) Int. Cl.
| G06F 3/041 | (2006.01) |
| G06F 3/042 | (2006.01) |
| G06F 3/0488 | (2013.01) |
| G06K 9/00 | (2006.01) |

(52) U.S. Cl.
CPC ............ G06F 3/042 (2013.01); G06F 3/04883 (2013.01); G06K 9/00442 (2013.01)

(58) Field of Classification Search
CPC ............ G06F 3/03545; G06F 3/03547; G06F 3/0487; G06F 3/0488; G06F 3/04883; G06F 3/04886; G06F 3/0233; G06F 3/0237; G06F 3/00416; G06F 17/276; G06K 9/00422; G06K 9/00429; G06K 9/00436; G06K 9/222; G06K 2209/01

USPC .......... 345/173–179; 178/18.01–18.09, 18.11
See application file for complete search history.

(56) References Cited

U.S. PATENT DOCUMENTS

| 2004/0126017 A1 * | 7/2004 | Seni et al. ...................... 382/229 |
| 2006/0209053 A1 * | 9/2006 | Cohen et al. .................. 345/179 |
| 2009/0138800 A1 * | 5/2009 | Anderson et al. ............. 715/702 |
| 2010/0169841 A1 * | 7/2010 | Singh ............................ 715/863 |

FOREIGN PATENT DOCUMENTS

| JP | 04-290188 A | 10/1992 |
| JP | 09-138678 | 5/1997 |
| JP | 2002-230483 | 8/2002 |
| JP | 2005-128940 A | 5/2005 |
| JP | 2008-090574 A | 4/2008 |

OTHER PUBLICATIONS

First Office Action mailed by Japan Patent Office on May 21, 2013 in the corresponding Japanese patent application No. 2012-261266.

* cited by examiner

*Primary Examiner* — Stephen Sherman
(74) *Attorney, Agent, or Firm* — Knobbe, Martens, Olson & Bear LLP

(57) ABSTRACT

According to one embodiment, an information processing apparatus capable of accessing a first storage medium and acquiring at least one of groups related to a correspondence between one symbol and at least one stroke data, includes an input device and a processor. The input device is configured to input an image. The processor is configured to, if a partial image of the image input by the input device corresponds to a first symbol in a first group or a first image generatable from first stroke data in the first group, associate the partial image and the first stroke data.

21 Claims, 9 Drawing Sheets

200

| X11, Y11, T11 -----SD11 ⎫ |
| X12, Y12, T12 -----SD12 ⎬ SD1 |
| ⋮ |
| X1n, Y1n, T1n -----SD1n ⎭ |

X21, Y21, T21 -----SD21 ⎫
X22, Y22, T22 -----SD22 ⎬ SD2
⋮
X2n, Y2n, T2n -----SD2n ⎭

X31, Y31, T31 -----SD31 ⎫
X32, Y32, T32 -----SD32 ⎬ SD3
⋮
X3n, Y3n, T3n -----SD3n ⎭

X41, Y41, T41 -----SD41 ⎫
X42, Y42, T42 -----SD42 ⎬ SD4
⋮
X4n, Y4n, T4n -----SD4n ⎭

X51, Y51, T51 -----SD51 ⎫
X52, Y52, T52 -----SD52 ⎬ SD5
⋮
X5n, Y5n, T5n -----SD5n ⎭

X61, Y61, T61 -----SD61 ⎫
X62, Y62, T62 -----SD62 ⎬ SD6
⋮
X6n, Y6n, T6n -----SD6n ⎭

X71, Y71, T71 -----SD71 ⎫
X72, Y72, T72 -----SD72 ⎬ SD7
⋮
X7n, Y7n, T7n -----SD7n ⎭

⋮

F I G. 3

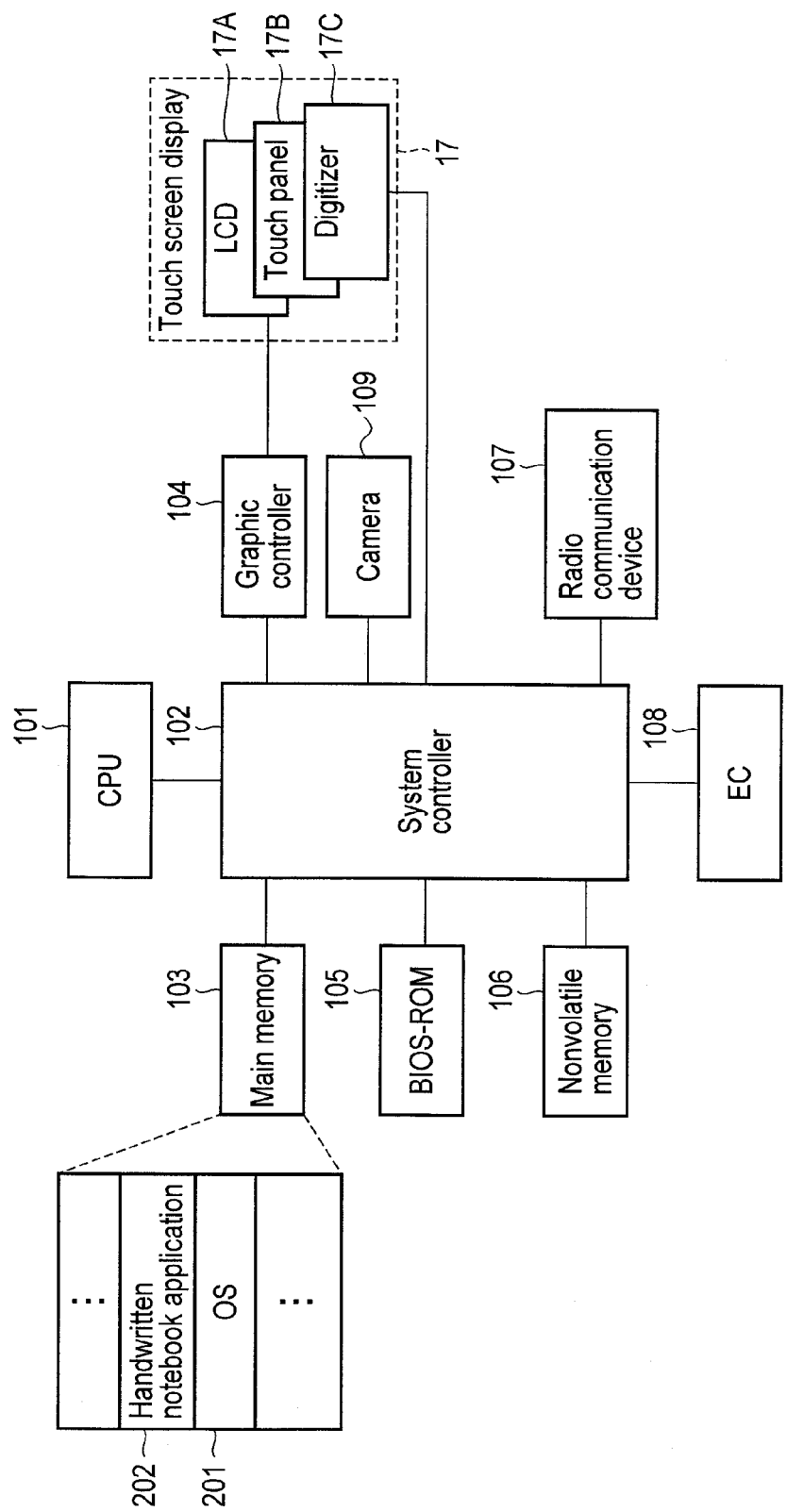
F I G. 4

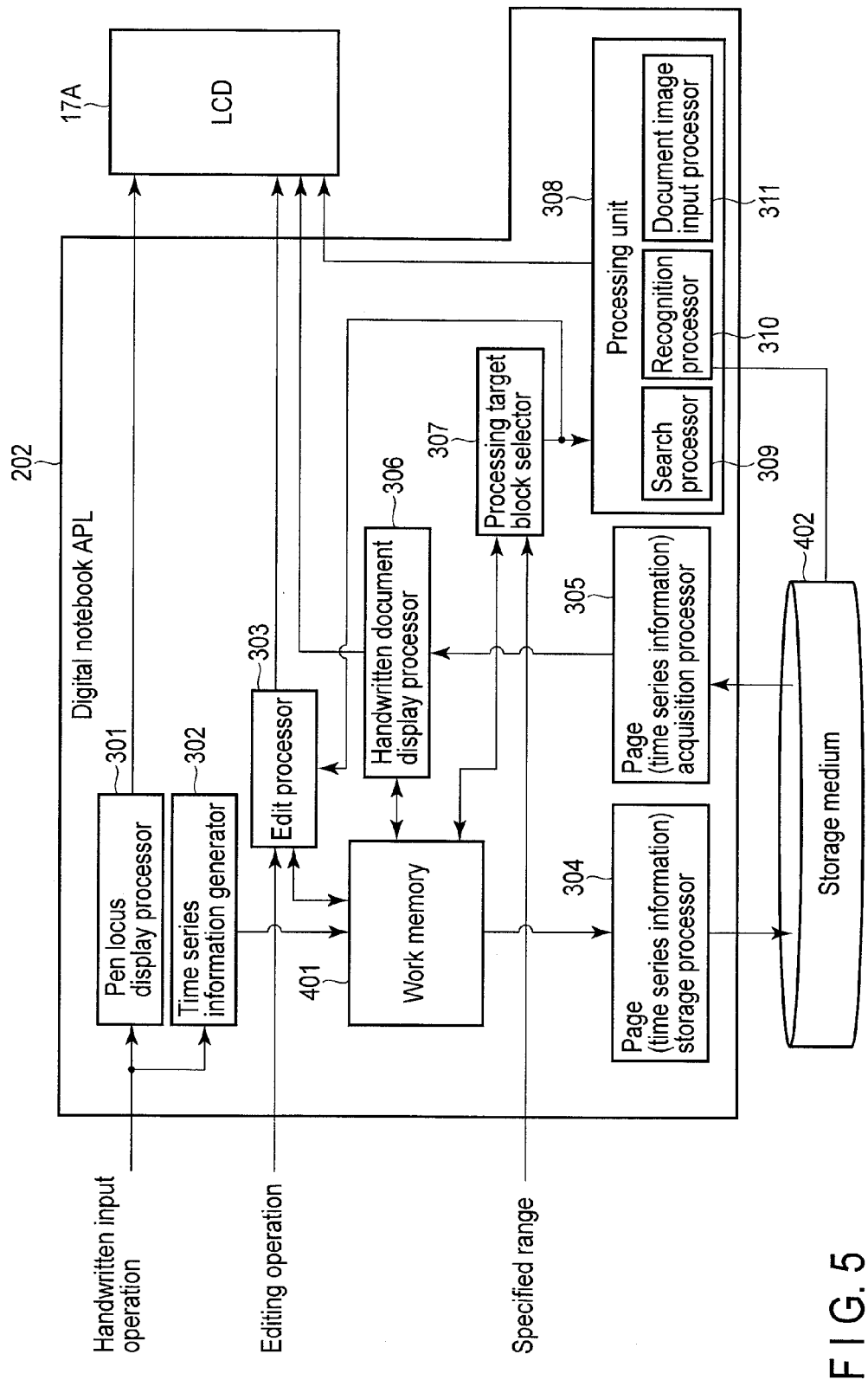
F I G. 5

| Character code | Stroke data group | Handwriting |
|---|---|---|
| 2341 | SD1, SD2 | --- A |
| | SDX1, SDX2 | --- A |
| | ⋮ | |
| 2342 | SD3, SD4 | --- B |
| | SD4, SD3 | --- B |
| | SDY3, SDY4 | --- B |
| | ⋮ | |
| 2343 | SD4 | --- C |
| | SDZ4 | --- C |
| | ⋮ | |
| ⋮ | ⋮ | |

F I G. 7

IMAGE PROCESSING APPARATUS, IMAGE PROCESSING METHOD AND STORAGE MEDIUM

CROSS-REFERENCE TO RELATED APPLICATIONS

This application is based upon and claims the benefit of priority from Japanese Patent Application No. 2012-261266, filed Nov. 29, 2012, the entire contents of which are incorporated herein by reference.

FIELD

Embodiments described herein relate generally to processing of a handwritten document.

BACKGROUND

In recent years, various kinds of information processing apparatus such as tablet computers, personal digital assistances (PDAs), and smartphones have been developed. Most such kinds of information processing apparatus include a touch screen display to facilitate an input operation by the user.

The user can instruct the information processing apparatus to execute a function associated with a menu or an object by touching the menu or the object displayed on the touch screen display by a finger or the like.

However, most existing information processing apparatuses including a touch screen display are consumer products seeking operability on images, music, and other various kinds of media data and may not necessarily be suitable for use in business in which document information of conferences, business negotiations, product development and the like needs to be processed. Regarding character input, an operation using a hardware keyboard is superior to a touch operation. Thus, paper notebooks are still widely used in business.

It is not easy for a conventional information processing apparatus to input a document written on an analog medium such as a paper, as digital data.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram illustrating time series information (handwritten page data) stored in a storage medium by the information processing apparatus according to the embodiment and corresponding to the handwritten document in FIG. 2.

FIG. 4 is an exemplary block diagram showing a system configuration of the information processing apparatus according to the embodiment.

FIG. 5 is an exemplary block diagram showing a function configuration of a handwritten notebook application program executed by the information processing apparatus according to the embodiment.

FIG. 7 is an exemplary diagram showing an example of a code/stroke correspondence table obtained by the handwritten input operation in FIG. 6.

DETAILED DESCRIPTION

Various embodiments will be described hereinafter with reference to the accompanying drawings.

In general, according to one embodiment, an information processing apparatus capable of accessing a first storage medium and acquiring at least one of groups related to a correspondence between one symbol and at least one stroke data, includes an input device and a processor. The input device is configured to input an image. The processor is configured to, if a partial image of the image input by the input device corresponds to a first symbol in a first group or a first image generatable from first stroke data in the first group, associate the partial image and the first stroke data.

Figure 1:
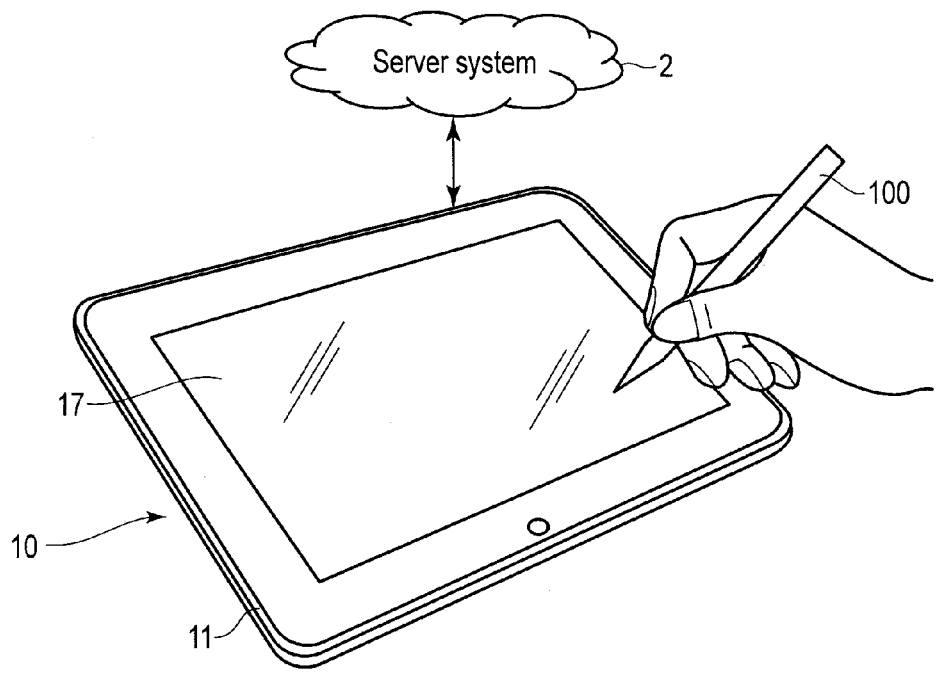
FIG. 1 is an exemplary perspective view showing an appearance of an information processing apparatus according to an embodiment.

FIG. 1 is a perspective view showing an appearance of an information processing apparatus according to an embodiment. The information processing apparatus is a stylus-based mobile information processing apparatus having an input device capable of handwritten input of a document by a stylus or finger. The information processing apparatus stores a document handwritten to the input device not as bitmap image data, but as one item or more of stroke data showing a symbol such as a character, number, mark, or figure or a times series of coordinates of sampling points of a stroke locus of a figure and a handwritten document can be searched for based on the stroke data. Thus, the information processing apparatus recognizes a correspondence between stroke data and symbols (bitmap image, handwriting). Based on the correspondence, the information processing apparatus can generate a bitmap image from the stroke data and thus, a part (character candidate region) of a document image input from a scanner, camera or the like and stroke data can be associated. Accordingly, the information processing apparatus can capture a document written on a paper notebook in the past as stroke data.

Further, the information processing apparatus may also perform character recognition processing on a part of stroke data (partial information corresponding to one symbol region) to store a handwritten document as text constituted of character codes so that a handwritten document can be searched for based on text. Therefore, the information processing apparatus recognizes a correspondence between one item or more of stroke data and character code. Based on the correspondence, the information processing apparatus can generate a bitmap image from a part of stroke data corresponding to each character code and so determine the character code of a part (character candidate region) of a document image input from a scanner, camera or the like.

Accordingly, the information processing apparatus capture a document written on a paper notebook in the past as digital text.

The information processing apparatus can be realized as a tablet computer, notebook personal computer, smartphone, PDA or the like. For convenience of description, it is assumed that the information processing apparatus is realized as a tablet computer 10. The tablet computer 10 is a mobile information processing apparatus that is also called a tablet or slate computer and includes a body 11 and a touch screen display 17 enabling handwritten input of a document. The touch screen display 17 is mounted on the top surface of the body 11 by being superposed thereon. Various operations can be input by touching the screen of the touch screen display 17 using a stylus or finger. A camera to capture a document image is provided on the back side of the body 11. By capturing an image by using the camera, images of not only documents printed or handwritten on paper, but also documents written on various analog media such as documents printed or handwritten on a cube can be captured.

The body 11 has a cabinet in a thin box shape. A flat panel display and a sensor configured to detect the contact position of a stylus or finger on the screen of the flat panel display are integrated into the touch screen display 17. The flat panel display may be, for example, a liquid crystal display (LCD). For example, a capacitance type touch panel, electromagnetic induction type digitizer or the like can be used as the sensor. A case in which two sensors of the digitizer and the touch panel are integrated into the touch screen display 17 will be described below.

Each of the digitizer and the touch panel is provided so as to cover the screen of the flat panel display. The touch screen display 17 can detect not only a touch operation on the screen using a finger, but also a touch screen on the screen using a special stylus 100. The stylus 100 may be an electromagnetic induction stylus. The user can use an external object (the stylus 100 or a finger) to perform a handwritten input operation on the touch screen display 17. A locus of movement of the external object (the stylus 100 or a finger) on the screen, that is, a locus of a stroke handwritten through a handwritten input operation is drawn in real time during handwritten input operation and the locus of each stroke is thereby displayed on the screen. A locus of movement of an external object while the external object is in contact with the screen corresponds to one stroke. A set of symbols such as characters, numbers, and marks or figures as a set of handwritten strokes constitute a handwritten document.

Figure 2:
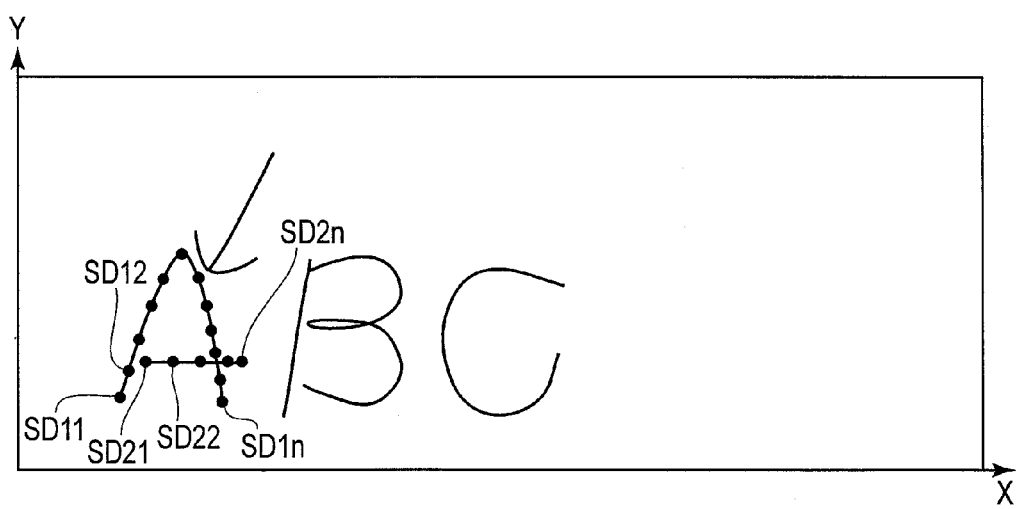
FIG. 2 is an exemplary diagram showing an example of a handwritten document handwritten on a touch screen display of the information processing apparatus according to the embodiment.

A handwritten document is stored in a storage medium as time series information showing a coordinate string of the locus of each stroke and an order relation between strokes. The time series information, which will be described in detail below with reference to FIGS. 2 and 3, shows the order in which a plurality of strokes is handwritten and contains a plurality of items of stroke data corresponding to each of the plurality of strokes. In other words, the time series information means a set of stroke data in a time series corresponding to each of the plurality of strokes. Each item of stroke data corresponds to some stroke and contains a coordinate data series (time series coordinates) corresponding to each point on the locus of the stroke. The order of a sequence of the stroke data corresponds to the order in which each stroke is handwritten, that is, the order of making strokes in writing.

The tablet computer 10 can read any existing time series information from a storage medium to display a handwritten document corresponding to the time series information, that is, a locus corresponding to each of a plurality of strokes indicated by the time series information on the screen. Further, the tablet computer 10 has an editing function. The editing function can delete or move any stroke or handwritten character in the handwritten document being displayed in accordance with an editing operation by the user using an eraser tool, range specifying tool and other various tools. Further, the editing function contains a function to delete the history of some handwritten operations. Further, the editing function can add any handwritten character or handwritten symbol to the handwritten document being displayed.

In the present embodiment, time series information (handwritten document) can be managed as one or a plurality of pages. In this case, time series information may be divided into area units contained in one screen to record a group of time series information contained in one screen as a page. Alternatively, the page size may be made variable. In this case, the page size can be extended to an area larger than the size of one screen and thus, a handwritten document of an area larger than the size of the screen can be handled as a page. If a whole page cannot be displayed on the screen at the same time, the page may be displayed in a reduced size or a display portion in the page may be moved by scrolling vertically or horizontally.

Time series information can be managed as page data as described above and thus, time series information will be called handwritten page data or simply handwritten data below.

The tablet computer 10 has a network communication function and can be linked to other personal computers or a server system 2 on the Internet. That is, the tablet computer 10 includes a wireless communication device such as a wireless LAN and can perform wireless communication with other personal computers. Further, the tablet computer 10 can perform communication with the server system 2 on the Internet. The server system 2 is a system to share various kinds of information and executes online storage services and other various cloud computing services. The server system 2 can be realized by one server computer or more.

The server system 2 includes a large-capacity storage medium such as a hard disk drive (HDD). The tablet computer 10 can store time series information (handwritten page data) in a storage medium of the server system 2 by transmitting the time series information to the server system 2 over a network (upload). To ensure secure communication between the tablet computer 10 and the server system 2, the server system 2 may authenticate the tablet computer 10 when communication starts. In this case, a dialog to prompt the user to enter the ID or password may be displayed on the screen of the tablet computer 10 or the ID or the like of the tablet computer 10 may automatically be transmitted from the tablet computer 10 to the server system 2.

Accordingly, even if the capacity of storage inside the tablet computer 10 is small, the tablet computer 10 can handle many items of time series information (handwritten page data) or large-capacity time series information (handwritten page data).

Further, the tablet computer 10 can read (download) any one item or more of time series information stored in a storage medium of the server system 2 to display the locus of each stroke indicated by the read time series information on the screen of the display 17 of the tablet computer 10. In this case, a list of thumbnails (thumbnail images) obtained by reducing each page of a plurality of items of time series information (handwritten page data) may be displayed on the screen of the display 17 or one page selected from these thumbnails may be displayed on the screen of the display 17 in the normal size.

Thus, according to the present embodiment, the storage medium where time series information is stored may be a storage device inside the tablet computer 10 or a storage device inside the server system 2. The user of the tablet computer 10 can store any time series information in any storage system selected from the storage device inside the tablet computer 10 and the storage device inside the server system 2.

Next, the relationship between a stroke (a symbol such as a character, number, or mark, a figure, or a table) handwritten by the user and time series information will be described with reference to FIGS. 2 and 3. FIG. 2 shows an example of a handwritten document (handwritten character string) handwritten on the touch screen display 17 by using the stylus 100 or the like.

A handwritten document frequently has another character or figure handwritten on a character or figure written once by hand. In FIG. 2, a character string of "ABC" is written in the order of "A", "B", and "C" and then, a handwritten arrow is handwritten near the handwritten character "A".

The handwritten character "A" can be represented by two strokes (a locus in a "Λ" shape and a locus in a "-" shape), that is, two loci handwritten using the stylus 100 or the like. The locus of the stylus 100 in the "Λ" shape written first by hand is sampled in real time, for example, at equal intervals and time series coordinates SD11, SD12, . . . , SD1n of a stroke in the "Λ" shape are thereby obtained. Similarly, the locus of the stylus 100 in the "-" shape written next by hand is sampled in real time, for example, at equal intervals and time series coordinates SD21, SD22, . . . , SD2n of a stroke in the "-" shape are thereby obtained.

The handwritten character "B" can be represented by two strokes, that is, two loci handwritten using the stylus 100 or the like. The handwritten character "C" can be represented by one stroke, that is, one locus handwritten using the stylus 100 or the like. The handwritten arrow can be represented by two strokes, that is, two loci handwritten using the stylus 100 or the like.

FIG. 3 shows time series information (handwritten page data) 200 corresponding to the handwritten document in FIG. 2. The time series information contains a plurality of items of stroke data SD1, SD2, . . . , SD7. In the time series information 200, stroke data SD1, SD2, . . . , SD7 are arranged in time sequence in the order of making strokes in writing, that is, in the order in which a plurality of strokes are handwritten.

In the time series information 200, the first two items of stroke data SD1, SD2 represent the two strokes of the handwritten character "A". The third and fourth items of stroke data SD3, SD4 represent the two strokes constituting the handwritten character "B". The fifth item of stroke data SD5 represents the one stroke constituting the handwritten character "C". The sixth and seventh items of stroke data SD6, SD7 represent the two strokes constituting the handwritten arrow.

Each item of stroke data contains a coordinate data series (time series coordinates) corresponding to one stroke, that is, a plurality of coordinates corresponding to each of a plurality of points on a locus of one stroke. In each item of stroke data, the plurality of coordinates are arranged in the order in which the strokes are written. Regarding the handwritten character "A", for example, stroke data SD1 contains a coordinate data series (time series coordinates) corresponding to each point on a locus of the stroke in the "Λ" shape of the handwritten character "A", that is, n items of coordinate data SD11, SD12, . . . , SD1n. Stroke data SD2 contains a coordinate data series corresponding to each point on a locus of the stroke in the "-" shape of the handwritten character "A", that is, n items of coordinate data SD21, SD22, . . . , SD2n. Incidentally, each item of stroke data may have a different number of items of coordinate data. Because coordinate data is sampled in a fixed period while an external object is in contact with the screen, the number of items of the coordinate data depends on the length of a stroke or a writing speed.

Each item of coordinate data shows an X-coordinate and a Y-coordinate corresponding to some one point inside the corresponding locus. For example, the coordinate data SD11 shows an X-coordinate (X11) and a Y-coordinate (Y11) of the start point of the stroke in the "Λ" shape. The coordinate data SD1n shows an X-coordinate (X1n) and a Y-coordinate (Y1n) of the end point of the stroke in the "Λ" shape.

Further, each item of coordinate data may contain time stamp information T corresponding to the time when the point corresponding to the coordinates is handwritten. The time of handwriting may be an absolute time (for example, month/day/year, hour/minute/second) or a relative time relative to some time point. For example, an absolute time (for example, month/day/year, hour/minute/second) when each stroke is started to be written may be added to each item of stroke data as time stamp information and further, a relative time showing a difference from the absolute time may be added to each item of coordinate data in stroke data as the time stamp information T.

By using time series information wherein the time stamp information T is added to each item of coordinate data as described above, the temporal relationship between strokes can be represented more precisely. Thus, the precision in character recognition of a group including one or a plurality of items of stroke data constituting one character can be improved.

Further, information Z showing handwriting pressure may be added to each item of coordinate data. The precision in character recognition of a group can further be improved if the handwriting pressure is also taken into consideration.

The time series information 200 having the structure described with reference to FIG. 3 can represent not only the locus of each stroke, but also the temporal relationship between strokes. Therefore, even if the tip portion of the handwritten arrow is written by superimposing on the handwritten character "A" or close to the handwritten character "A" as shown in FIG. 2, the handwritten character "A" and the tip portion of the handwritten arrow can be handled as separate characters or figures by using the time series information 200.

As the time stamp information of stroke data SD1, any one item of information selected from a plurality of items of time stamp information T11 to T1n corresponding to a plurality of coordinates in stroke data SD1 or the average value of time stamp information T11 to T1n may be used. Similarly, as the time stamp information of stroke data SD2, any one item of information selected from a plurality of items of time stamp information T21 to T2n corresponding to a plurality of coordinates in stroke data SD2 or the average value of time stamp information T21 to T2n may be used. Also similarly, as the time stamp information of stroke data SD7, any one item of information selected from a plurality of items of time stamp information T71 to T7n corresponding to a plurality of coordinates in stroke data SD7 or the average value of time stamp information T71 to T7n may be used.

In the time series information 200 according to the present embodiment, as described above, the sequence of stroke data SD1, SD2, . . . , SD7 shows the order of making strokes of handwritten characters. For example, the sequence of stroke data SD1 and SD2 indicates that the stroke in the "Λ" shape is first handwritten and then, the stroke in the "-" shape is handwritten. Therefore, even if two handwritten characters have similar handwriting, these two handwritten characters can be distinguished as different characters if the orders of making strokes of these two handwritten characters are different.

Further in the present embodiment, as described above, a handwritten document is stored as the time series information 200 formed of a set of a plurality of items of stroke data corresponding to a plurality of strokes and thus, handwritten characters can be handled without depending on the language of handwritten characters. Therefore, the structure of the time series information 200 according to the present embodiment can be used commonly in various countries in which different languages are used.

FIG. 4 is a diagram showing the system configuration of the tablet computer 10.

The tablet computer 10 includes, as shown in FIG. 4, a CPU 101, a system controller 102, a main memory 103, a graphics controller 104, a BIOS-ROM 105, a nonvolatile memory 106, a wireless communication device 107, an embedded controller (EC) 108, and a camera 109.

The CPU 101 is a processor that controls the operation of various modules inside the tablet computer 10. The CPU 101 executes various kinds of software loaded from the nonvolatile memory 106 as a storage device into the main memory 103. Such software includes an operating system (OS) 201 and various application programs. Application programs include a handwritten notebook application program 202. The handwritten notebook application program 202 has a function to create and display the above handwritten page data, a function to edit the handwritten page data, a handwriting (stroke) search function, a character recognition function, and a document input function. The document input function is a function to input a document image read by a scanner or camera as stroke data or text and details thereof will be provided later.

The CPU 101 also executes a basic input/output system (BIOS) stored in the BIOS-ROM 105. The BIOS is a program to control hardware.

The system controller 102 is a device to establish a connection between a local bus of the CPU 101 and various components. The system controller 102 also contains a memory controller to control access to the main memory 103. The system controller 102 also has a function to communicate with the graphics controller 104 via a serial bus conforming to PCI EXPRESS or the like.

The graphics controller 104 is a display controller to control an LCD 17A used as a display monitor of the tablet computer 10. A display signal generated by the graphics controller 104 is sent to the LCD 17A. The LCD 17A displays a screen image based on the display signal. A touch panel 17B and a digitizer 17C are arranged on the LCD 17A. The touch panel 17B is an electrical capacitance pointing device for input on the screen of the LCD 17A. The contact position on the screen where a finger is in contact and movement of the contact position are detected by the touch panel 17B. The digitizer 17C is an electromagnetic induction pointing device for input on the screen of the LCD 17A. The contact position on the screen where the stylus 100 is in contact and movement of the contact position are detected by the digitizer 17C.

The wireless communication device 107 is a device configured to perform wireless communication such as wireless LAN or 3G mobile communication. The EC 108 is a one-chip microcomputer containing an embedded controller for power management. The EC 108 has a function to turn on or turn off the tablet computer 10 in accordance with the operation of the power button by the user.

The camera 109 is provided on the back side of the body to photograph a document handwritten or printed on another analog medium such as paper. Image data of the photographed document is captured by the tablet computer 10 as time series information or text by the document input function of the handwritten notebook application program 202. However, in contrast to the case when handwritten on the touch screen display 17, the order of making strokes in writing cannot be determined and time series information in which stroke data is arranged in the order of handwriting is not obtained and instead, one item or more of stroke data contained in image data of a document is obtained.

Next, the function configuration of the handwritten notebook application program 202 will be described with reference to FIG. 5.

The handwritten notebook application program 202 includes a stylus locus display processor 301, a time series information generator 302, an edit processor 303, a page storage processor 304, a page acquisition processor 305, a handwritten document display processor 306, a processing target block selector 307, a processing unit 308, and a document image input processor 311.

The handwritten notebook application program 202 creates, displays, or edits handwritten page data or recognizes characters by using stroke data input by using the touch screen display 17. The handwritten notebook application program 202 also performs document input processing that converts image data of a document photographed by the camera 109, read by a scanner (not shown), or captured by other devices and transmitted from a server system into stroke data and further into text. The touch screen display 17 is configured to detect events such as touch, move (slide), and release. Touch is an event indicating that an external object is in contact with the screen. Move (slide) is an event indicating that the touch position has moved while an external object is in contact with the screen. Release is an event indicating that an external object has moved away from the screen.

The stylus locus display processor 301 and the time series information generator 302 receive an event of touch or move (slide) generated by the touch screen display 17, thereby detecting a handwritten input operation. The touch event contains coordinates of the contact position. The move (slide) event also contains coordinates of the contact position at the movement destination. Therefore, the stylus locus display processor 301 and the time series information generator 302 can receive a coordinate string corresponding to a locus of movement of the contact position from the touch screen display 17.

The stylus locus display processor 301 receives a coordinate string from the touch screen display 17 and, based on the coordinate string, displays the locus of each stroke handwritten by a handwritten input operation using the stylus 100 or the like on the screen of the LCD 17A in the touch screen display 17. The locus of the stylus 100 while the stylus 100 is in contact with the screen, that is, the locus of each stroke is drawn on the screen of the LCD 17A by the stylus locus display processor 301.

The time series information generator 302 receives the above coordinate string output from the touch screen display 17 and, based on the coordinate string, generates the above time series information having a structure described in detail with reference to FIG. 3. In this case, the time series information, that is, coordinates corresponding to each point of the stroke and time stamp information may temporarily be stored in a work memory 401.

The page storage processor 304 stores the generated time series information in a storage medium 402 as handwritten page data. The storage medium 402 is a local database to store handwritten page data. Incidentally, the storage medium 402 may be provided inside the server system 2.

The page acquisition processor 305 reads any stored time series information (handwritten page data) from the storage medium 402. The read time series information is sent to the handwritten document display processor 306 and a recognition processor 310. The handwritten document display processor 306 analyzes the time series information and, based on the analysis result, displays handwriting as the locus of each stroke indicated by each item of stroke data in the time series information on the screen as a handwritten page.

The edit processor 303 performs processing to edit the handwritten page currently being displayed. That is, the edit processor 303 performs edit processing including processing to add a new stroke (a new handwritten character, a new handwritten mark or the like) to the handwritten page currently being displayed and processing to delete or move one or more strokes of a plurality of displayed strokes in accordance with an editing operation and a handwritten input operation performed by the user on the touch screen display 17. Further, the edit processor 303 updates the time series information to reflect edit processing results in the time series information being displayed.

The user can delete any stroke of a plurality of strokes being displayed by using the eraser tool or others. The user can also specify the range of any portion inside time series information (handwritten page) being displayed by using the range specification tool to surround any portion on the screen with a circle or quadrangle. The time series information portion to be processed, that is, a stroke data group to be processed is selected by the processing target block selector 307 in accordance with the specified range on the screen specified by the range specifying operation. That is, the processing target block selector 307 selects the time series information portion to be processed from a first stroke data group corresponding to each stroke belonging to the specified range by using the time series information being displayed.

For example, the processing target block selector 307 extracts the first stroke data group corresponding to each stroke belonging to the specified range from the time series information being displayed and decides stroke data in the first stroke data group excluding second stroke data that is discontiguous from other stroke data in the first stroke data group as the time series information portion to be processed.

When the menu item such as Delete or Move is selected from the edit menu by the user, the edit processor 303 performs processing such as the deletion or movement on the stroke data group selected by the processing target block selector 307. In this case, if a plurality of items of stroke data are selected as a stroke data group, the edit processor 303 can collectively delete the plurality of items of stroke data from the screen or move the stroke data to another position on the screen. In time series information, times series coordinates of each item of moved stroke data may automatically be changed in accordance with the destination position. Alternatively, an operation history indicating that time series coordinates of each item of moved stroke data have been changed may be added to the time series information. Each item of deleted stroke data may not necessarily be deleted from time series coordinates and an operation history indicating that each item of the stroke data has been deleted may be added to the time series information.

The processing unit 308 can perform various kinds of processing, for example, handwriting search processing or character recognition processing on time series information to be processed. The processing unit 308 includes a search processor 309 and the recognition processor 310.

Further, the processing unit 308 can associate input image data with time series information by checking image data of a document input from the camera 109 or the like against bitmap images based on time series information input in the past and detecting time series information of similar bitmap images. Further, input image data can be associated with text by using character recognition results of time series information input in the past. The above processing is performed by the document image input processor 311.

The search processor 309 searches a plurality of items of time series information (a plurality of handwritten pages) stored in the storage medium 402 to detect a specific time series information portion (such as a specific character string) in the plurality of items of time series information. The search processor 309 contains a specifying module configured to specify a specific time series information portion as a search key, that is, as a search query. The search processor 309 detects a time series information portion having the locus of a stroke whose similarity to the locus of a stroke corresponding to a specific time series information portion is equal to a reference value or more from each of a plurality of items of time series information. The search processor 309 further reads handwritten page data containing the detected time series information portion from the storage medium 402 to display the handwritten page data on the screen of the LCD 17A in such a way that the locus corresponding to the detected time series information portion can be recognized.

A specific handwritten character, a specific handwritten character string, a specific handwritten symbol, or a specific handwritten figure can be used as a specific time series information portion specified as a search query. For example, one or more strokes constituting a handwritten object (a handwritten character, handwritten mark, or handwritten figure) handwritten on the touch screen display 17 can be used as a search key.

Search processing performed by the search processor 309 is a handwriting search. The search processor 309 searches for a handwritten character string having handwriting similar to a specific handwritten character string as a search query from a plurality of recorded handwritten pages. Incidentally, a handwriting search of only one handwritten page currently being displayed may also be performed.

The search processor 309 searches for a handwritten page containing features similar to features of one or more strokes as a search key from the storage medium 402. As features of each stroke, the stroke writing direction, shape, inclination, and the like can be used. In this case, handwritten page data (hit handwritten page) containing a handwritten character whose similarity to a stroke of a handwritten character as a search key is equal to a reference value or more is searched from the storage medium 402. Various methods can be used as the calculation method of a similarity between handwritten characters. For example, a coordinate string of each stroke may be handled as a vector. In this case, to calculate the similarity between vectors to be compared, an inner product of vectors to be compared may be calculated as the similarity between vectors to be compared. As another example, the locus of each stroke may be handled as an image to calculate the size of the area of a portion with the largest overlapping of images between loci to be compared as the above similarity. Further, any method may be devised to reduce the amount of computation. Also, dynamic programming (DP) matching may be used as the calculation method of the similarity between handwritten characters.

Thus, stroke data is used as a search key, instead of a code group indicating a character string, and therefore, a search independent of the language can be performed.

The search processing can be performed not only on a handwritten page data group in the storage medium 402, but also on a handwritten page data group stored in a storage medium of the server system 2. In this case, the search processor 309 transmits a search request including one item or more of stroke data corresponding to one stroke or more to be used as a search key to the server system 2. The server system 2 searches for handwritten page data (hit handwritten page) having features similar to features of one item or more of stroke data from a storage medium and transmits the hit handwritten page to the tablet computer 10.

The above specifying module inside the search processor 309 may display a search key input area to write by hand a character string or figure to be searched for. A character string or the like handwritten in the search key input area by the user is used as a search query.

Alternatively, the above processing target block selector 307 may be used as the specifying module. In this case, the processing target block selector 307 can select a specific time series information portion in the time series information being displayed as the character string or figure to be searched for in accordance with a range specifying operation performed by the user. The user may specify the range by surrounding a partial character string in the page being displayed or newly write by hand a character string for search query in a blank space of the page being displayed to specify the range by surrounding the character string for search query.

For example, the user can specify the range by surrounding a part in the page being displayed with a circle or quadrangle. Alternatively, the user may set the handwritten notebook application program 202 to the selection mode by using a menu prepared in advance to subsequently trace a part of the page being displayed using the stylus 100.

Thus, when a time series information portion (handwritten character string) in the time series information (handwritten page) being displayed is selected as a search query, the search processor 309 excludes the time series information portion selected as the search query from the search target. That is, the search processor 309 detects a time series information portion having the locus of a stroke whose similarity to the locus of the stroke corresponding to the selected time series information portion is equal to a reference value or more from the other time series information portion in the time series information being displayed excluding the selected time series information portion, instead of the whole time series information being displayed.

By performing processing to exclude a time series information portion selected as a search query from the search target, the selected time series information portion (character string to be naturally searched for) can be prevented from being displayed as a search result.

Thus, the user can input a search query by performing an operation of newly writing by hand a character string to be used as a search query in the page being displayed and selecting the search query. In this case, the character string (search query) newly handwritten is excluded from the search target and thus, the character string newly handwritten will not be displayed as a search result. Therefore, a part of the handwritten page being displayed can easily be used as a search query without displaying a search key input area on the screen.

In the present embodiment, as described above, a handwritten character similar to features of the handwritten character selected as the search query can be searched for from a plurality of recorded handwritten pages. Therefore, a handwritten page fitting to the intention of the user can easily be searched for from many handwritten pages created and stored in the past.

In the handwriting search according to the present embodiment, in contrast to the case of text search, there is no need for character recognition. Therefore, the search does not depend on the language and handwritten pages handwritten in all languages can be searched for. Further, a figure can be used as a search query for handwriting search and also a symbol, mark or the like other than the language can also be used as a search query for handwriting search.

The recognition processor 310 performs character recognition of the time series information (handwritten page) being displayed. The recognition processor 310 performs character recognition of each of a plurality of blocks (handwritten blocks) obtained by performing grouping processing on one item or more of stroke data indicated by the time series information on which recognition processing is performed and converts each of handwritten characters in the plurality of blocks into character code. Time series information contains, in addition to handwriting (bitmap image), the order of making strokes in writing and time stamp information and in some cases, handwriting pressure information and thus, the precision of recognition is high. In the grouping processing, one item or a plurality of items of stroke data indicated by time series information on which recognition processing is performed is grouped in such a way that items of stroke data corresponding to strokes positioned close to each other and written continuously by hand are classified into the same block.

Thus, the character code of the group corresponding to each character can be obtained from time series information. If the character code is arranged based on the group arrangement, text data of handwritten page data of one page is obtained and both are associated and stored in the storage medium 402. When the character code is obtained by the recognition processor 310, a code/stroke correspondence table associating each character code with a group of the time series information is obtained and the correspondence table is also stored in the storage medium 402. The correspondence table is used to convert a set of stroke data into text data after an input document being associated with the stroke data.

The document image input processor 311 performs processing to convert image data of a document photographed by the camera 109, read by a scanner (not shown), or captured by another device and transmitted from a server system into a set of stroke data by matching processing with time series information stored in the storage medium 402. When the document is converted into a set of stroke data, the character code can be obtained by using the above correspondence table. That is, like OCR (optical character recognition), a candidate region of one character is cut out from the document image based on a line structure and radical information of characters. On the other hand, many images based on groups stored in the storage medium 402 are generated. By checking an image in the candidate region against many images, an image similar to the image in the candidate region, that is, a group is obtained. If a group is obtained, the character code can be obtained from the correspondence table.

In the present embodiment, the character code is obtained from time series information showing handwritten writing of a person taking the order of making strokes in writing also into consideration and thus, the precision of character recognition is high. In the conventional OCR, the character code is obtained by matching of image information, but the reference image of OCR is not user-specific image data and instead a standard image and thus, the precision of character recognition is lower compared with the present embodiment.

A concrete operation example of the embodiment will be described below. First, the procedure for handwritten page creation processing performed by the handwritten notebook application program 202 will be described with reference to the flow chart in FIG. 6.

When the user performs a handwritten input operation using the stylus 100 (block B11), an event such as touch and move is generated. Based on the event, the handwritten notebook application program 202 detects the locus of movement of the stylus 100 (block B12). If the locus of movement of the stylus 100 is detected (YES in block B12), the handwritten notebook application program 202 displays the detected locus of movement of the stylus 100 on the display (block B13). Further, the handwritten notebook application program 202 generates the above time series information as shown in FIG. 3 based on a coordinate string corresponding to the detected locus of movement of the stylus 100 and temporarily stores the time series information in the work memory 401 as handwritten page information (block B14).

Next, the handwritten page information in the work memory 401 is delivered to the recognition processor 310 to perform handwritten character recognition processing. First, in block B16, stroke data of the time series information is divided into groups in such a way that items of stroke data corresponding to strokes positioned close to each other and written continuously by hand are classified into the same group. A group corresponds to one symbol and is formed from one or a plurality of items of stroke data. In the example in FIG. 3, stroke data SD1, SD2 is formed into one group, stroke data SD3, SD4 is formed into one group, and stroke data SD5 is formed as a group. In block B18, character recognition processing of one group is performed to decide candidate characters. In block B20, language processing is performed to determine a linguistically probable character string. If, for example, "fext" is decided as a candidate, "f" is changed to "t" to present "text" as a recognition result. Accordingly, the time series information and a character code string (text) of a document input by handwriting are obtained. If necessary, recognition processing is repeated by changing groupings of stroke data after returning to block B16.

In block B22, text as a character code string as a result of character recognition and the time series information (FIG. 3) are associated and stored in the storage medium 402 in units of page. The text corresponding to the time series information in FIG. 3 is (2341, 2342, 2343, 222d, . . . ) (hexadecimal). Accordingly, the tablet computer 10 can capture a document input by handwriting also as text.

The correspondence to the character code is determined for each group by the above processing and a code/stroke correspondence table storing a plurality of groups representing a correspondence between one symbol and one item or more of stroke data is created, which is stored in the storage medium 402 in block B24. FIG. 7 shows an example of the code/stroke correspondence table. The code/stroke correspondence table may have a group for each character code. The stroke data contained in groups of the code/stroke correspondence table may be information that can display a stroke and may be information obtained by, for example, deleting the order of making strokes, time stamp information, and handwriting pressure from the time series information. In some cases, however, even the same person may write the same character in different handwriting and thus, different groups may be associated with one character code. Further, even the same person with the same handwriting may write a character in different orders of making strokes and thus, a group formed from a set of the same stroke data and having different orders may be associated. Each time a new handwritten page is added, the code/stroke correspondence table in the storage medium 402 is updated by adding data thereto.

Figure 8:
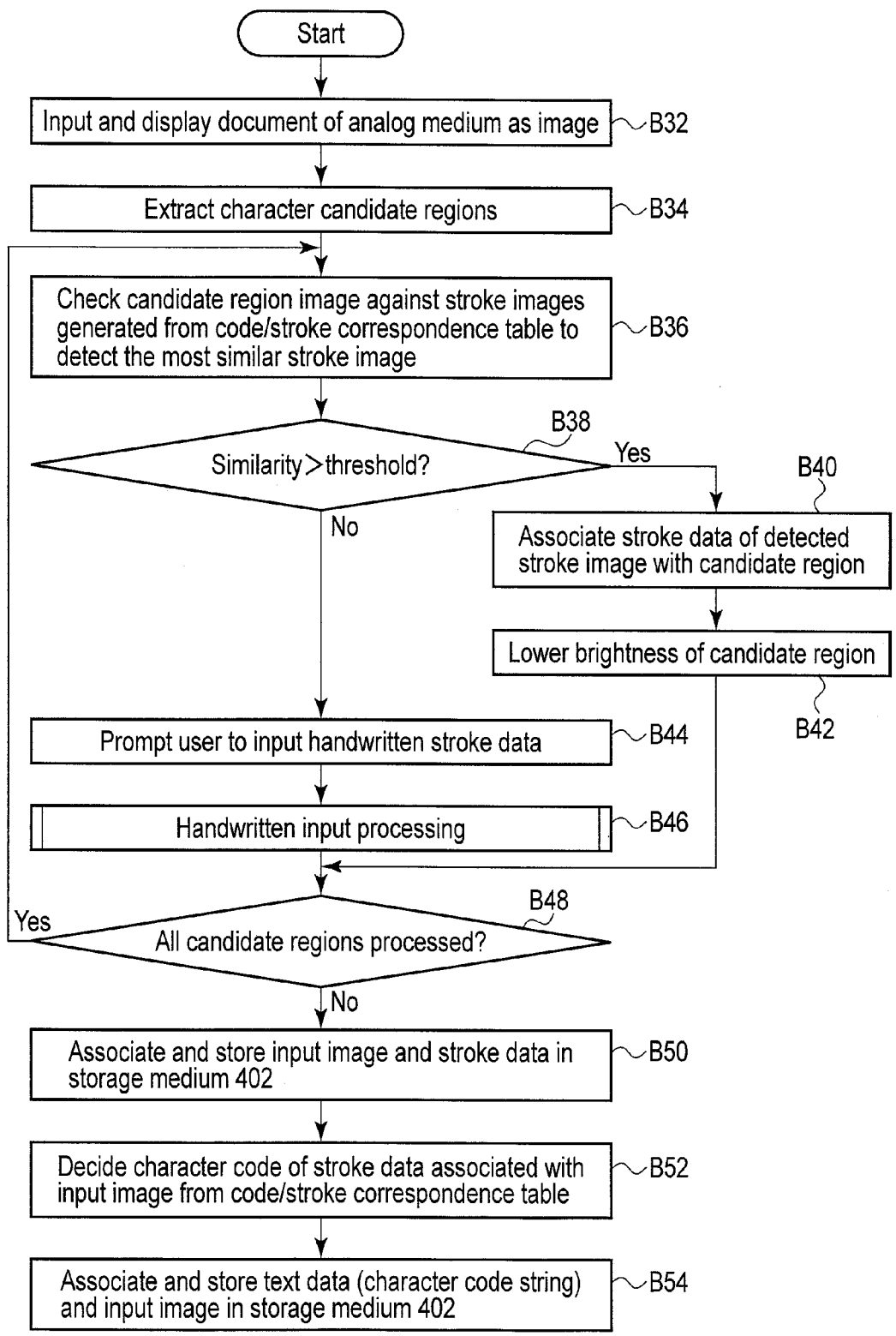
FIG. 8 is an exemplary diagram showing the flow of document image input processing performed by the information processing apparatus according to the embodiment.

FIG. 8 is a flow chart showing processing by the document image input processor 311.

Figure 9:
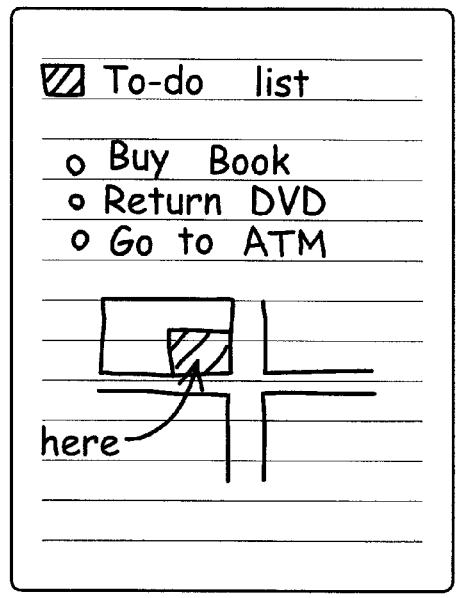
FIG. 9 is an exemplary diagram showing an example of a document image.

In block B32, a document on an analog medium is input as an image from a scanner or camera. Documents include a document written in a notebook in the past and a document written on a whiteboard. An input image is displayed on the touch screen display 17. FIG. 9 is a display example of the input image.

In block B34, the line structure of characters in the image is analyzed to extract candidate regions of one character (or a radical) as image portions.

In block B36, stroke images (handwriting images) are generated based on stroke data of each group of the code/stroke correspondence table in FIG. 7 and a partial image of the candidate region extracted in block B34 is checked against the stroke images to detect a stroke image similar to the image of the candidate region.

Figures 10A, 10B:
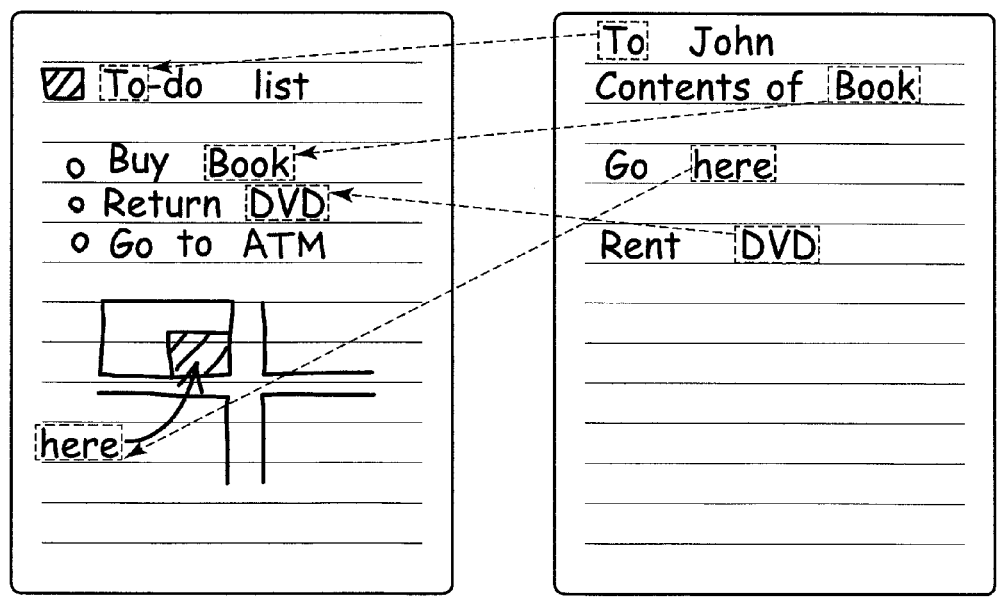
FIGS. 10A and 10B are exemplary diagrams schematically showing an example of image checking as a part of the document image input processing in FIG. 8.
Figure 11:
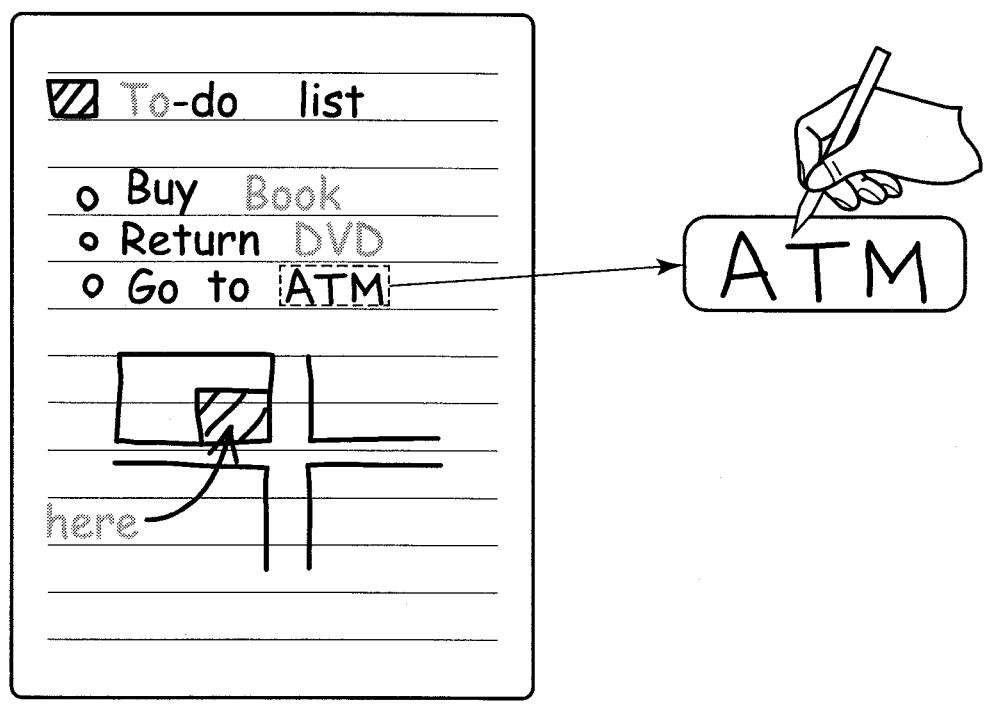
FIG. 11 is an exemplary diagram showing an example of a user interface when the image checking cannot be done in the document image input processing in FIG. 8.

In block B38, whether the similarity of the similar stroke image is equal to a threshold or more is determined. If the similarity is equal to the threshold or more, in block B40, the group of the stroke image is associated with the candidate region. FIGS. 10A and 10B schematically show the association. FIG. 10A is an input image shown in FIG. 9. FIG. 10B is a stroke image stored in the storage medium 402 and represented by time series information of one page. Broken lines between the FIGS. 10A and 10B indicate the association. Though FIG. 10B shows only one page, but a similar stroke image may not be obtained from time series information of a single page and a similar image is frequently a stroke data image of time series information of a different page for each candidate region. The display mode of a candidate region associated with a group is changed from the display mode of other regions (block B42). For example, as shown in FIG. 11, the brightness of an image of a candidate region associated with a group is lowered.

If the similarity is not equal to the threshold or more, a group corresponding to the candidate region image is not stored in the storage medium 402 and thus, in block B44, the user is prompted to input stroke data of the candidate region by handwriting. As described in block B42, the brightness of the image of the candidate region for which a recognition result is obtained is lowered and thus, the candidate region whose brightness does not change is considered to indicate to be the target of a handwritten input operation, but to emphasize the region more, the display may be flashed, the region may be surrounded with a frame, or a sound message may be issued.

Figure 6:
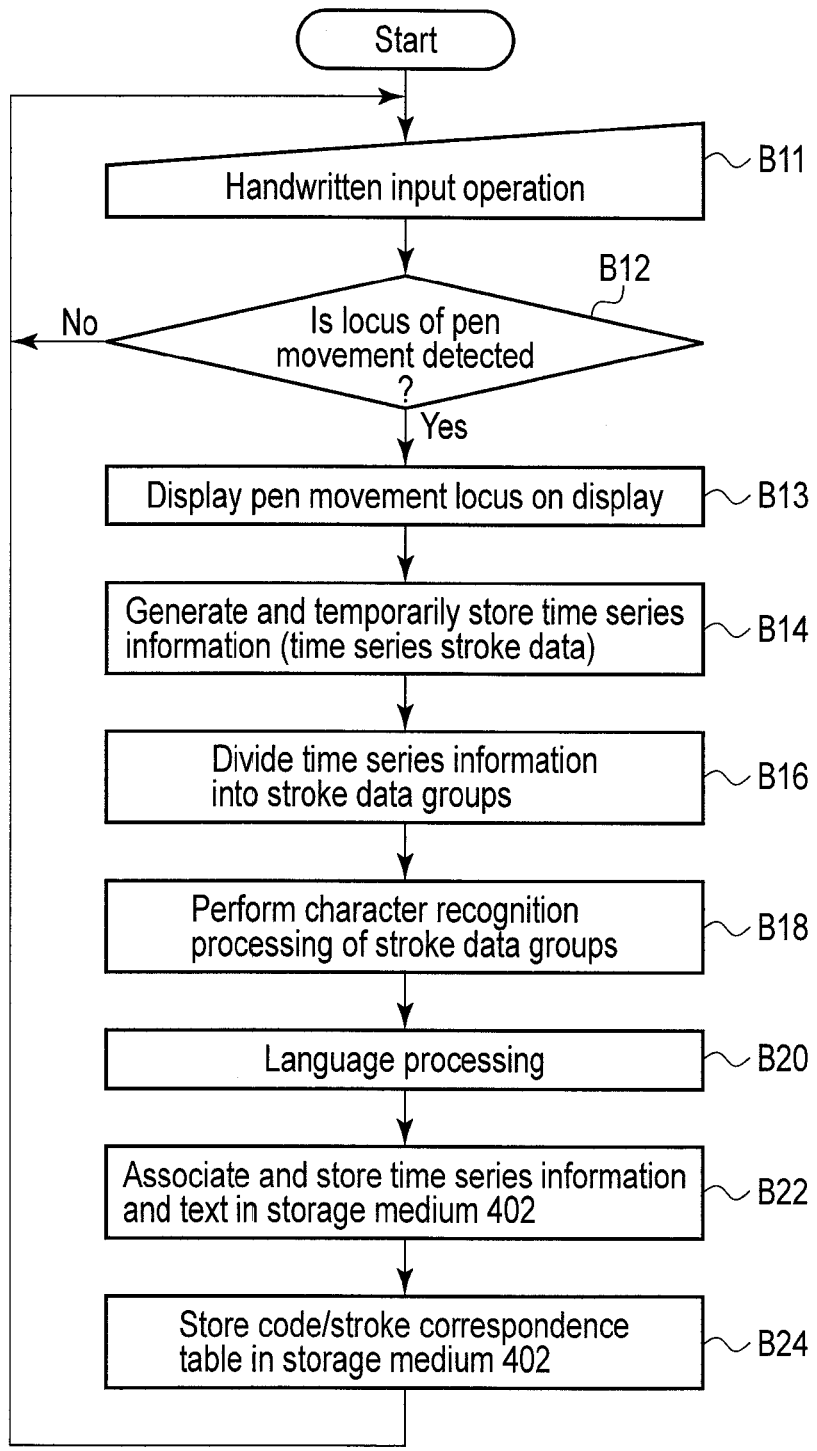
FIG. 6 is an exemplary diagram showing the flow of handwritten input processing performed by the information processing apparatus according to the embodiment.

If the user traces an image of a candidate region on the touch screen display 17 using the stylus 100, in block B46, the handwritten input processing shown in FIG. 6 is performed. Handwritten input may be done for an image without character code, for example, a map image in FIG. 11, other than symbols such as characters, numbers, and marks. In block B48, whether processing of all candidate regions is completed is determined and if not completed, the processing returns to block B36.

Accordingly, stroke data (excluding time stamp information) for the document image is obtained and, in block B50, the image and the corresponding stroke data are associated and stored in the storage medium 402. Because the stroke data is determined and an image can be reproduced therefrom, the input image may not be stored.

Like a document handwritten by the user on the touch screen display 17 using the stylus 100, a document written on a paper notebook in the past can be captured by the above processing into the tablet computer 10 as stroke data (however, time stamp information is excluded).

Further, the group of each character candidate region of the input image is determined and thus, the character code of each character candidate region of the input image can be determined based on the code/stroke correspondence table in FIG. 7 (block B52). Accordingly, an input image can be captured into the tablet computer 10 as text (block B54).

According to the embodiment, as described above, a document input into the touch screen display 17 by handwriting can be stored in the storage medium 402 as stroke data indicating a handwritten locus. Further, a character candidate region is extracted from the document input as an image from a camera, scanner or the like and if an image based on stroke data already input by handwriting corresponds to the candidate region image, the candidate region and the stroke data can be associated. Accordingly, like a document input into the touch screen display 17 by handwriting, a document written on, for example, a paper notebook by hand can be stored in the storage medium 402 as stroke data.

Further, if the character code is determined by performing character recognition processing on stroke data of a document input into the touch screen display 17 by handwriting in advance, the document input as an image can be converted into text. Because the stroke data is information for each user, when compared with the conventional OCR based on image matching with a reference image, the precision of character recognition is high. Further, the precision of recognition can be improved still more by adding information of such as the order of making strokes in writing, time stamp information, and handwriting pressure.

All processing is performed by the tablet computer 10 in the embodiment, but processing excluding handwriting into the touch screen display 17 may be performed on the side of the server system 2. For example, the function of the processing unit 308 of the handwritten notebook application may be transferred to the side of the server system 2. In addition, instead of storing in the storage medium 402, a database of the server system 2 may be used for storage. In such a case, the code/stroke correspondence table may be managed for each user or stroke data of all users may be associated with each character code commonly for all users. Alternatively, the code/stroke correspondence table may be managed for each similar category (man/woman, child/adult, nationality alphabetically and so on).

Because processing in the present embodiment can be realized by a computer program, effects similar to those in the present embodiment can easily be realized only by installing the computer program on a computer through a computer readable storage medium storing the computer program and executing the program.

Incidentally, the present invention is not limited to the above embodiment and can be embodied by modifying structural elements in the stage of working without deviating from the spirit thereof. Also, various inventions can be formed by appropriately combining a plurality of structural elements disclosed in the above embodiment. For example, some structural elements may be deleted from all structural elements shown in the embodiment. Further, structural elements extending over different embodiments may appropriately be combined.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus configured to access a storage medium storing stroke data representing handwritten strokes forming characters, the apparatus comprising:
an input device configured to input a document image;
a processor configured to:
identify a first portion of the document image;
determine whether the first portion of the document image represents an image of a first handwritten character whose stroke data is stored in the storage medium;
associate the first portion of the document image with the stroke data for the first handwritten character when the first portion of the document image represents the image of the first handwritten character;
identify a second portion of the document image;
determine whether the second portion of the document image represents an image of a second handwritten character whose stroke data is stored in the storage medium;
associate the second portion of the document image with the stroke data for the second handwritten character when the second portion of the document image represents the image of the second handwritten character; and
provide a file comprising at least the first portion and the second portion of the document image and at least part of the stroke data for the first handwritten character and the second handwritten character.

2. The electronic apparatus of claim 1, wherein
the processor is configured to identify the first portion and the second portion so that the first portion and the second portion of the document image comprise an image of a character candidate region.

3. The electronic apparatus of claim 1, wherein
the processor is further configured to issue a message prompting to input at least one stroke data corresponding to a third portion of the document image.

4. The electronic apparatus of claim 1, further comprising:
a touch screen display; and
a storage controller configured to store at least one stroke data corresponding to a handwritten stroke on the touch screen display in the storage medium.

5. The electronic apparatus of claim 1, wherein
the processor is further configured to read a first character code associated with the first portion of the document image and associate the first character code with the first portion of the document image in the file.

6. The electronic apparatus of claim 5, further comprising:
a touch screen display; and
a generator configured to generate at least one stroke data based on a handwritten input operation performed on the touch screen display,
wherein the first character code is acquired by a process of character recognition of the at least one stroke data generated by the generator.

7. The electronic apparatus of claim 1, wherein the input device comprises one of a camera or a scanner.

8. A method of using a storage medium storing stroke data representing handwritten strokes forming characters, the method comprising:
- inputting a document image;
- identifying a first portion of the document image;
- determining whether the first portion of the document image represents an image of a first handwritten character whose stroke data is stored in the storage medium;
- associating the first portion of the document image with the stroke data for the first handwritten character when the first portion of the document image represents the image of the first handwritten character;
- identifying a second portion of the document image;
- determining whether the second portion of the document image represents an image of a second handwritten character whose stroke data is stored in the storage medium;
- associating the second portion of the document image with the stroke data for the second handwritten character when the second portion of the document image represents the image of the second handwritten character; and
- providing a file comprising at least the first portion and the second portion of the document image and at least part of the stroke data for the first handwritten character and the second handwritten character.

9. The method of claim 8, wherein
the first portion and the second portion of the document image are identified so that the first portion and the second portion of the document image comprise an image of a character candidate region.

10. The method of claim 8, further comprising:
issuing a message prompting to input at least one stroke data corresponding to a third portion of the document image.

11. The method of claim 8, further comprising:
storing at least one stroke data corresponding to a handwritten stroke on a touch screen display in the storage medium.

12. The method of claim 8, further comprising:
reading a first character code associated with the first portion of the document image and associating the first character code with the first portion of the document image in the file.

13. The method of claim 12, further comprising:
generating at least one stroke data based on a handwritten input operation performed on a touch screen display, wherein the first character code is acquired by a process of character recognition of the at least one generated stroke data.

14. The method of claim 8, wherein the document image is acquired by using one of a camera or a scanner.

15. A non-transitory computer-readable storage medium storing computer-executable instructions that, when executed, cause a computer comprising a first storage medium storing stroke data representing handwritten strokes forming characters, to:
- input a document image;
- identify a first portion of the document image;
- determine whether the first portion of the document image represents an image of a first handwritten character whose stroke data is stored in the storage medium;
- associate the first portion of the document image with the stroke data for the first handwritten character when the first portion of the document image represents the image of the first handwritten character;
- identify a second portion of the document image;
- determine whether the second portion of the document image represents an image of a second handwritten character whose stroke data is stored in the storage medium;
- associate the second portion of the document image with the stroke data for the second handwritten character when the second portion of the document image represents the image of the second handwritten character; and
- provide a file comprising at least the first portion and the second portion of the document image and at least part of the stroke data for the first handwritten character and the second handwritten character.

16. The storage medium of claim 15, wherein
the first portion and the second portion of the document image are identified so that the first portion and the second portion of the document image comprises an image of a character candidate region.

17. The storage medium of claim 15, wherein the instructions further cause the computer:
to issue a message prompting to input at least one stroke data corresponding to a third portion of the document image.

18. The storage medium of claim 15, wherein the instructions further cause the computer:
to store at least one stroke data corresponding to a handwritten stroke on a touch screen display in the first storage medium.

19. The storage medium of claim 15, wherein the instructions further cause the computer:
to read a first character code associated with the first portion of the document image, wherein the file further comprises the first character code.

20. The storage medium of claim 19, wherein the instructions further cause the computer:
to generate at least one stroke data based on a handwritten input operation performed on a touch screen display, wherein the first character code is acquired by a process of character recognition of the at least one generated stroke data.

21. The storage medium of claim 15, wherein the document image is acquired by using one of a camera or a scanner.

* * * * *